Dec. 11, 1951  D. C. TURNER ET AL  2,578,111
FOLDING BELLOWS FOR PHOTOGRAPHIC DEVICES
Filed May 5, 1948  2 SHEETS—SHEET 1

INVENTORS
Donald C. Turner
Edward F. Thomas
BY Arthur R. Thomas
Charles Shepard
their Attorney Dec. 11, 1951 D. C. TURNER ET AL 2,578,111
FOLDING BELLOWS FOR PHOTOGRAPHIC DEVICES
Filed May 5, 1948 2 SHEETS—SHEET 2

INVENTORS
Donald C. Turner
Edward F. Thomas
BY Arthur R. Thomas
Charles Shepard
their Attorney Patented Dec. 11, 1951

2,578,111

UNITED STATES PATENT OFFICE 2,578,111

FOLDING BELLOWS FOR PHOTOGRAPHIC DEVICES

Donald C. Turner, Brighton, and Edward F. Thomas and Arthur R. Thomas, Rochester, N. Y., assignors to D. C. Turner, Inc., Rochester, N. Y., a corporation of New York Application May 5, 1948, Serial No 25,284

1 Claim. (Cl. 95—39)

The present invention relates to bellows of the kind used commonly but not exclusively in photographic equipment, such as cameras. Most photographic cameras of the collapsible or folding type are provided with bellows, and such cameras constitute probably the largest field of use of bellows, but similar bellows are frequently used also in other items of photographic equipment, such as enlargers and projectors, and are sometimes used in viewing boxes, musical instruments, and other equipment in fields other than photography.

The present invention deals with an improved bellows for any or all of the foregoing uses. The bellows will be frequently referred to in the following description of the invention as a "camera bellows" merely for convenience of description, but it is to be understood that the mention of a camera is merely a convenient example of a widsespread field of use of such bellows, and is not to be taken as a limitation upon the invention.

The bellows, whether used in a photographic camera or elsewhere, may be either of the general shape of a truncated pyramid or of the general shape of a prism. Because pyramidal bellows are somewhat more common, the present invention is illustrated in connection with pyramidal bellows merely as a convenient example, but it must be understood that the invention is equally applicable to prismatic bellows in which the general planes of opposite side walls are approximately parallel to each other (as in the usual "accordion" musical instrument) rather than converging toward each other, as customary in most small photographic cameras.

The bellows, for most photographic purposes, must be light-tight, and for certain other purposes, as in an accordion, is must be air-tight. In either case, it is highly desirable that the bellows be as light and flexible as is reasonably possible consistent with the folds of the bellows maintaining their desired definite locations and the flat areas between the folds remaining flat and neat in appearance.

A object of the present invention is the provision of a generally improved and more satisfactory bellows for use in any of the fields above indicated, and particularly an improved and more satisfactory bellows for cameras and other photographic equipment.

Another object of the invention is the provision of a bellows with better and more economical stiffening in the flat areas between the folds, without interfering with maximum flexibility of the folds themselves.

Still another object is the provision of bellows so constructed that the folds may be extremely flexible, without interfering with the desired stiffening of the flat areas between the folds.

A further object of the invention is the provision of bellows in which the stiffening of the flat areas between the folds may be accomplished more quickly, easily, and accurately than in the prior constructions.

A still further object is the provision of bellows in which the means for stiffening the flat areas between the folds of the bellows is of such form that the entire bellows may be made thinner and therefore lighter and more flexible than has been possible with prior constructions.

Heretofore bellows have usually been of a laminated construction, having at least two layers or plies, and the stiffening of the areas between the fold lines has usually been accomplished by the insertion between the plies, before they are cemented to each other, of strips of paper or other stiff sheet material, applied individually by hand, piece by piece (an extremely laborious and costly operation) or applied by means of an expensive and complicated machine, or applied in form of a series of strips of stiffening sheet material connected to each other by narrow connecting portions, this last mentioned prior practice having the disadvantage that the connecting portions necessarily extend across the fold lines of the bellows and interfere to some extent with the desired high degrees of flexibility at the fold lines. The thickness of the stiffening strips has also added materially to the overall thickness of the laminated bellows material. It is still another object of the present invention to provide stiffening means in a form which eliminates the tedious and expensive hand application of individual strips as above mentioned, and which eliminates the necessity for any costly and complicated machine for applying the stiffening means, and which eliminates entirely the presence of any stiffening material (whether in the form of narrow connecting strips or otherwise) from the fold lines of the bellows, thus enabling the attainment of the maximum degree of flexibility along the fold lines. It is also an object of the invention to provide stiffening means in a form which, although applicable to laminated bellows, is not necessarily used with laminated bellows, and may be used effectively and satisfactorily with bellows made from a single layer of material rather than a plurality of layers or plies.

These and other desirable objects are accomplished by the construction disclosed as an illustrative embodiment of the invention in the following description and in the accompanying drawings forming a part hereof, in which.

The same reference numerals throughout the several views indicate the same parts.

Figure 1:
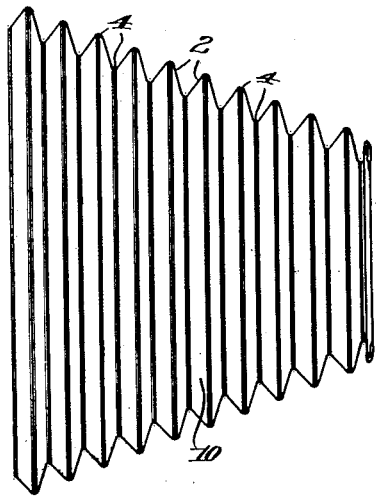
Fig. 1 is a side view of a camera bellows made in accordance with and illustrating one embodiment of the invention.
Figure 2:
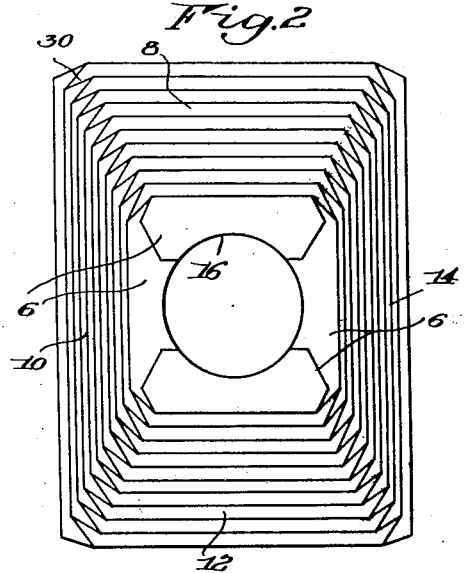
Fig. 2 is a front view thereof further illustrative of the manner in which is collapses into a flattened condition.

Referring more particularly to the drawings and first to Figs. 1 and 2 thereof, 2 indicates the substantially flat transverse faces and 4 the intervening crease lines that form the ridges and valleys of the foldable pleats that provide the collapsible and extensible characteristics of the bellows. Terminal flaps may be provided at either or both ends of the bellows, such flaps 6 being shown at the forward ends of the four walls indicated in general at 8, 10, 12, and 14. These flaps or other suitable terminal portions of the bellows are cemented or otherwise secured to a bellows frame at one end and a lens board at the other end, or to other suitable face plates, depending on the exact use to which the bellows are put. When used with a photographic camera, the front of the bellows is provided with a central lens opening 16.

Figure 3:
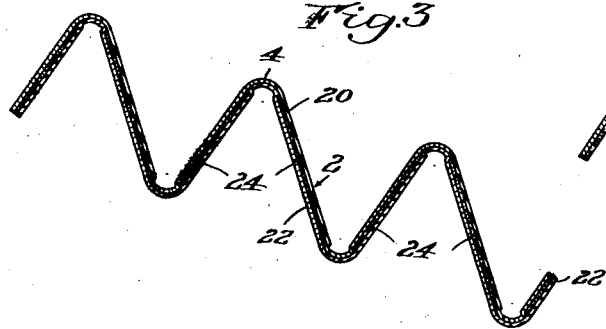
Fig. 3 is an enlarged fragmentary section through one of its walls.
Figure 6:
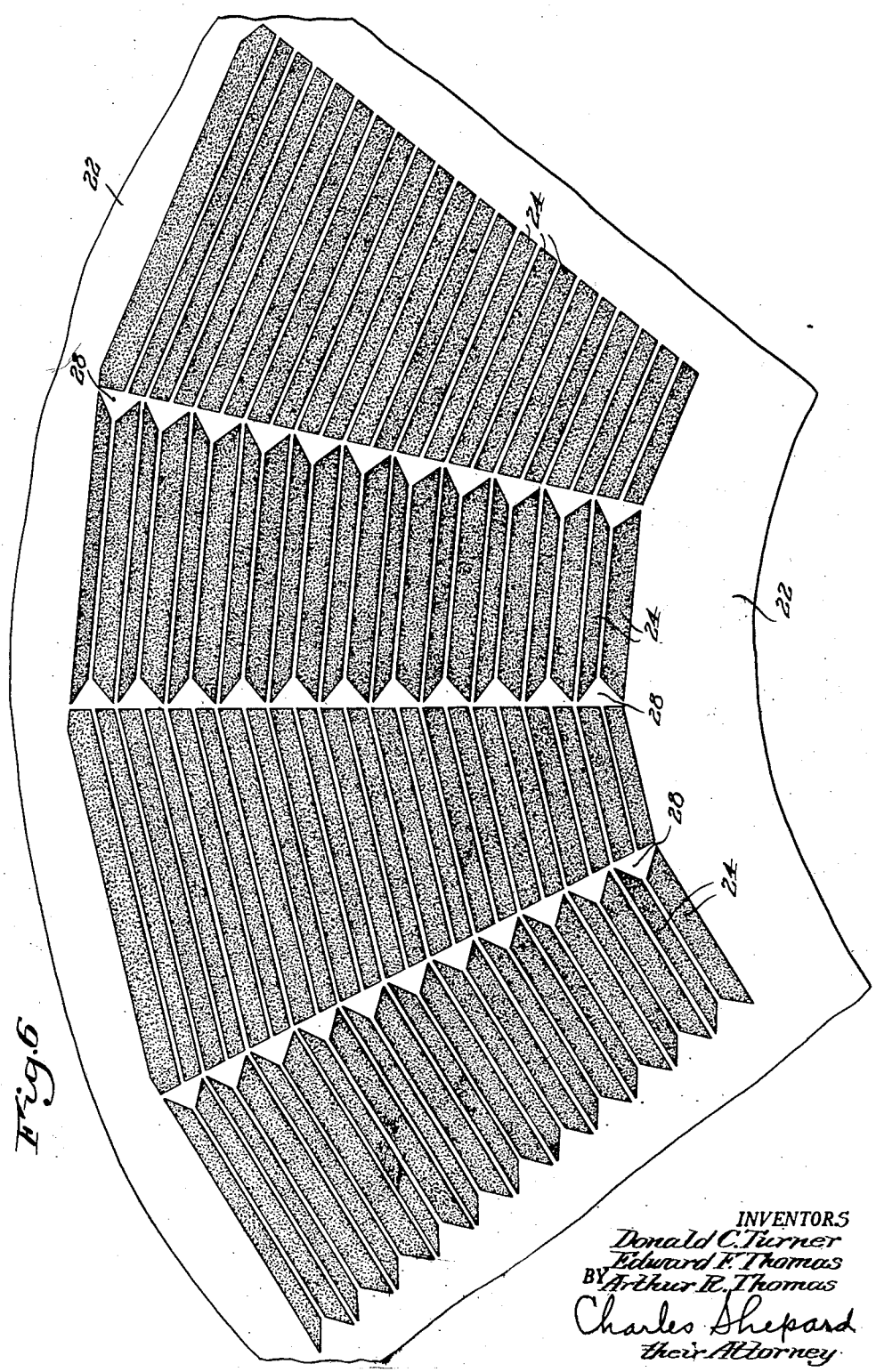
Fig. 6 is a plan view of the blank of Figs. 4 and 5.

In the bellows of the present preferred embodiment, there are employed the outer leather body 20 and the textile fabric lining 22 superimposed and cemented together with stiffening elements 24 intervening on the areas intermediate the fold or crease lines 4, only. In producing these stiffening strips, the roughly segmental lining blank of Fig. 6 is provided and disposed in a smooth flat condition as shown. A substantially commensurate stencil or template is next overlaid on this, which stencil plate has openings or porous areas identical with the stippled areas of the showing of the figure, namely, the areas 24, but masks off imperviously the light portions thereof. A heavy sizing material in liquid, semi-liquid, or viscous form is then applied through the stencil openings by brush, spray, or other convenient manner so that it is deposited upon the fabric beneath in the design shown in the figure, and is allowed to dry, the stencil of course being removed. Then a similar blank 20 of the outer leather component is superposed on the first, after a coating of adhesive has been applied, and the whole structure is cemented together as in Fig. 3.

That part of the sheet constituting a single side of the bellows may be separately stenciled and stiffened if desired, although it is usually preferred to apply the sizing material simultaneously to the entire sheet constituting all four sides of the bellows.

When these laminated components thus become unified, the composite laminated structure is next creased along lines following the outlines of the stiffened areas 24, both longitudinally and transversely. The unstiffened triangular portions 28, Fig. 6, form corner ridges or folds 30 (Fig. 2) that also facilitate the generation of the previously flat sheet into the ultimate pyramidal form wherein the four rows of stiffened areas of Fig. 6 become the four sides of the pyramidal bellows. The combined blanks, after drying, are of course trimmed to proper size and outline and their longitudinal edges are skived for overlapping attachment.

It will be observed that in this way the outlines and arrangements in rows of the stiffened areas 24 are as exact as the stencil openings in the master template itself, and yet these areas are absolutely detached from each other and no amount of stiffening, even to a minor extent, crosses any of the creases to interfere with their regularity and flexibility.

In some cases, the stiffening material 24 (which may conveniently be referred to as a sizing material or agent) may itself form the adhesive for uniting the two layers 20 and 22 with each other. Usually, however, it is preferred to use a separate adhesive or cement, so that the two layers 20 and 22 will be adhesively united throughout their entire areas, including the unsized or unstiffened areas. Usually, also, it is preferable to allow both the sizing agent and the adhesive agent to dry while the layers 20 and 22 are still in flat form, before they are folded up into pyramidal shape and before the pleats are folded therein. But at times it may be desired to accomplish the folding and pleating before the adhesive agent has fully set or hardened, so that it will set or harden when the bellows is in pleated condition, thus tending to maintain the pleats or folds in proper alinement.

Figure 5:
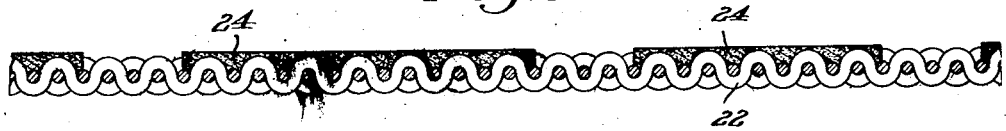
Fig. 5 is a similar further enlarged sectional view illustrating an alternative construction.

The invention obviously may be practiced with a bellows formed of only a single layer or sheet, rather than the laminated or two-ply construction above mentioned. Indeed, one of the substantial advantages of the present construction is that it enables the use of a single-ply bellows, while still securing adequate stiffening of the flat areas between the creases, heretofore obtainable only in a two-ply construction. If two plies are used, the stiffening or sizing agent may be applied directly to the outer leather body 20 instead of to the lining 22, but it is usually preferred to apply the stiffening to the textile fabric because, as shown in Fig. 5, the liquid sizing locks better with the woven texture thereof, than with the smoother surface of the leather layer. Preferably, it fills the interstices of the fabric on only one side, as illustrated, but the presence or absence of the stiffening agent on the opposite side of the fabric will depend on factors such as the viscosity of the stiffening agent at the time of application, the quantity applied, and the openness or fineness of weave of the textile fabric.

Figure 4:
Fig. 4 is an enlarged fragmentary section through a flat blank constituting a component of the bellows.

Using a sizing agent of relatively low viscosity, on a relatively permeable or open-weave fabric, adequate stiffening may usually be secured by a moderate quantity of sizing agent which is entirely or almost entirely impregnated into the fabric, without standing up appreciably above the surface of the fabric, as indicated diagrammatically in Fig. 5. But when a thicker layer of the sizing agent is desired, or when it is more viscous and does not permeate so readily into the pores or interstices of the fabric, the sizing agent may stand up or protrude to an appreciable extent above the surface of the lamination (whether of fabric, leather, or other material) to which it is applied, as indicated diagrammatically in Fig. 4. Even when the sizing agent does protrude as in Fig. 4, however, it usually has less thickness than the stiffening strips of paper customarily used in the prior art.

Figure 8:
Fig. 8 is a view similar to a fragment of Fig. 5, illustrating still another alternative form.

In Fig. 8 there is indicated diagrammatically a fragment of the sheet material 22 with the sizing material 24 impregnated entirely through the thickness of the sheet material and showing on the opposite face thereof.

Figure 7:
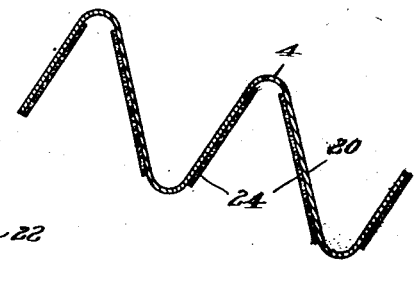
Fig. 7 is a view similar to a portion of Fig. 3, illustrating a modified construction.

It has been mentioned above that the bellows may be made of a single ply, with the sizing agent applied directly to one face (usually the inner face) of the sheet material. Such a construction is indicated diagrammatically in Fig. 7, wherein it is seen that the sizing or stiffening agent 24 is applied to the sheet or layer 20 constituting the body of the bellows.

The stiffening or sizing agent of the present invention may be any suitable material which, on the one hand, is sufficiently fluid to be readily applied through a silk screen stencil or other suitable stencil or template or to be applied by a printing form or die in a manner similar to that in which ink is applied to a sheet of paper from inked printing type; and which, on the other hand, is capable of drying or hardening within a reasonably short time, which may be anywhere from a few seconds to several hours. As examples of suitable stiffening or sizing agents, there may be mentioned paint, glue, and the usual sizing agents customarily used to stiffen cloth for various industrial and commercial purposes. A resinous paint, made from a base of either natural or synthetic resin, or a casein paint, is quite satisfactory. A phenolic resin glue is also very satisfactory particularly in the form in which it is readily available on the market, accompanied by a catalyst which is to be mixed with the glue immediately prior to using it, which catalyst initiates the setting-up or hardening process. The paint known as rubber paint is also highly satisfactory for the purposes of the present invention.

The bellows of the present invention will fold easily and quickly into an extremely small space, so is well adapted for use in modern small cameras where only a very small compartment is provided for receiving the bellows when the camera is collapsed.

For convenience and in accordance with custom in certain branches of the photographic field, the outer layer of the bellows material (whether it constitutes the only layer, or one of a plurality of layers) has been referred to as "leather." It should be understood, however, that this term is to be interpreted broadly as referring to any flexible sheet material which is substantially light-tight. In earlier years, the outer layer of a camera bellows was usually made of a thin layer of natural leather; hence the origin of the term. Later, "leatherette" or other artificial leather came to be used, but today the bellows "leather" is often merely a piece of tightly woven and light-impervious fabric which can scarcely be considered even an artificial leather.

It is seen from the foregoing disclosure that the above-mentioned objects of the invention are admirably fulfilled. It is to be understood that the foregoing disclosure is given by way of illustrative examples only, rather than by way of limitation, and that without departing from the invention, the details may be varied within the scope of the appended claim.

What is claimed is:

A collapsible bellows for photographic devices, comprising a sheet of flexible fabric formed into a four-sided body having openings at two opposite ends, each side of said body being folded transversely on a multiplicity of fold lines to form a multiplicity of crosswise pleats so that said body as a whole may be repeatedly expanded and contracted endwise, and adhesive stiffening and sizing material applied in fluid condition to the fabric only in the areas of the fabric between the fold lines and adhering tenaciously to said fabric upon drying and providing sufficient stiffness when dry to maintain said areas of said fabric in substantially flat condition during normal folding and unfolding of said bellows, the fabric being free of said stiffening and sizing material along said fold lines.

DONALD C. TURNER.
EDWARD F. THOMAS.
ARTHUR R. THOMAS.

REFERENCES CITED

The following references are of record in the file of this patent:

UNITED STATES PATENTS

| Number | Name | Date |
| --- | --- | --- |
| 981,200 | Kroedel | Jan. 10, 1911 |
| 1,500,391 | Hutchings | July 8, 1924 |
| 2,331,951 | Wright et al. | Oct. 19, 1943 |

FOREIGN PATENTS

| Number | Country | Date |
| --- | --- | --- |
| 330,438 | Great Britain | June 12, 1930 |